United States Patent [19]
London Shrader et al.

[11] Patent Number: 5,870,611
[45] Date of Patent: Feb. 9, 1999

[54] INSTALL PLAN OBJECT FOR NETWORK INSTALLATION OF APPLICATION PROGRAMS

[75] Inventors: Theodore Jack London Shrader, Cedar Park; John Lawrence Bunce; Juan Manuel Nuncio, both of Austin, all of Tex.

[73] Assignee: International Business Machines Corporation, Armonk, N.Y.

[21] Appl. No.: 975,973

[22] Filed: Nov. 21, 1997

Related U.S. Application Data

[63] Continuation of Ser. No. 416,666, Apr. 5, 1995, abandoned.

[51] Int. Cl.$^6$ ........................................................ G06F 09/44
[52] U.S. Cl. ............................ 395/712; 345/333; 345/334
[58] Field of Search ............................. 395/712; 345/333, 345/334, 339, 340, 348

[56] References Cited

U.S. PATENT DOCUMENTS

| | | |
|---|---|---|
| 4,227,245 | 10/1980 | Edblad et al. . |
| 4,558,413 | 12/1985 | Schmidt et al. . |
| 5,155,837 | 10/1992 | Liu et al. . |
| 5,155,847 | 10/1992 | Kirouac et al. . |
| 5,257,376 | 10/1993 | Beck et al. . |
| 5,293,674 | 3/1994 | Wolber et al. . |
| 5,295,244 | 3/1994 | Dev et al. . |
| 5,315,703 | 5/1994 | Matheny et al. . |
| 5,339,430 | 8/1994 | Lundin et al. . |
| 5,339,435 | 8/1994 | Lubkin et al. . |
| 5,349,674 | 9/1994 | Calvert et al. . |
| 5,359,721 | 10/1994 | Kempf et al. . |
| 5,359,730 | 10/1994 | Marron . |
| 5,361,360 | 11/1994 | Ishigami et al. . |
| 5,367,633 | 11/1994 | Matheny et al. . |
| 5,369,570 | 11/1994 | Parad . |
| 5,371,884 | 12/1994 | Ross . |
| 5,379,429 | 1/1995 | Hirasawa et al. . |
| 5,379,430 | 1/1995 | Nguyen . |
| 5,394,522 | 2/1995 | Sanchez-Frank et al. ............... 395/159 |
| 5,487,141 | 1/1996 | Cain et al. ............................. 395/135 |
| 5,546,526 | 8/1996 | Li et al. ................................. 395/159 |
| 5,666,501 | 9/1997 | Jones et al. ............................ 345/348 |

OTHER PUBLICATIONS

"Transformer Rules Strategy for Software Distribution Mechanism–Support Products", IBM Tech. Disclosure Bulletin, vol. 37 No. 04B Apr. 1994 pp. 523–524.

"Node List Presentation in the LAN Netview Start Transformer Status Window", IBM/Tech. Disclosure Bulletin, vol. 37 No. 02B Feb. 1994 pp. 9–10.

Technical Disclosure Bulletin, vol. 36 No. 10 Oct. 1993. Design for Cataloging Databases at a Server Workstation, p. 319.

Technical Disclosure Bulletin, vol. 37 No. 02B Feb. 1994. Node List Presentation In the LAN NetView Start Transformer Status Window.

Technical Disclosure Bulletin, vol. 37 No. 04A Apr. 1994. Automatic Creation of an Attribute Value File for IBM LAN Netview Start Databases.

Technical Disclosure Bulletin, vol. 37 No. 04B Apr. 1994. Transformer Rules Strategy for Software Distribution Mechanism–Support Products, pp. 523–525.

*Primary Examiner*—James P. Trammell
*Assistant Examiner*—Kakali Chaki
*Attorney, Agent, or Firm*—Jeffrey S. LaBaw

[57] ABSTRACT

An installation plan object is built for installing an application in a network. The empty installation plan object is first created from a template of a prototypical installation plan object. Next, from a workspace container object containing potential child objects of the installation plan object, objects are selected for inclusion in the installation plan object. The selected objects are transformed into child objects of the installation plan object. The objects which are selected to populate an install plan object include an application object and a group object which respectively represent an application to be installed over the network and a group of workstations upon which the application is to be installed. After transformation, these objects are converted into an application-in-plan object and a group-in-plan object respectively. Other potential child objects include a category object having a plurality of response file objects each for installing a respective one of a plurality of applications over the network.

17 Claims, 16 Drawing Sheets

62        CODE SERVER CONTAINER

| CODE SERVER | 350 |
|---|---|
| Alias Name | 351 |
| Alias Drive | 353 |
| Server Name | 355 |
| Redir | 357 |
| * Transport Type | 359 |

| APPLICATION IMAGE | 400 |
|---|---|
| Application Dir | 401 |
| * Application Name | 403 |
| Application Alias | 405 |

FIG. 6

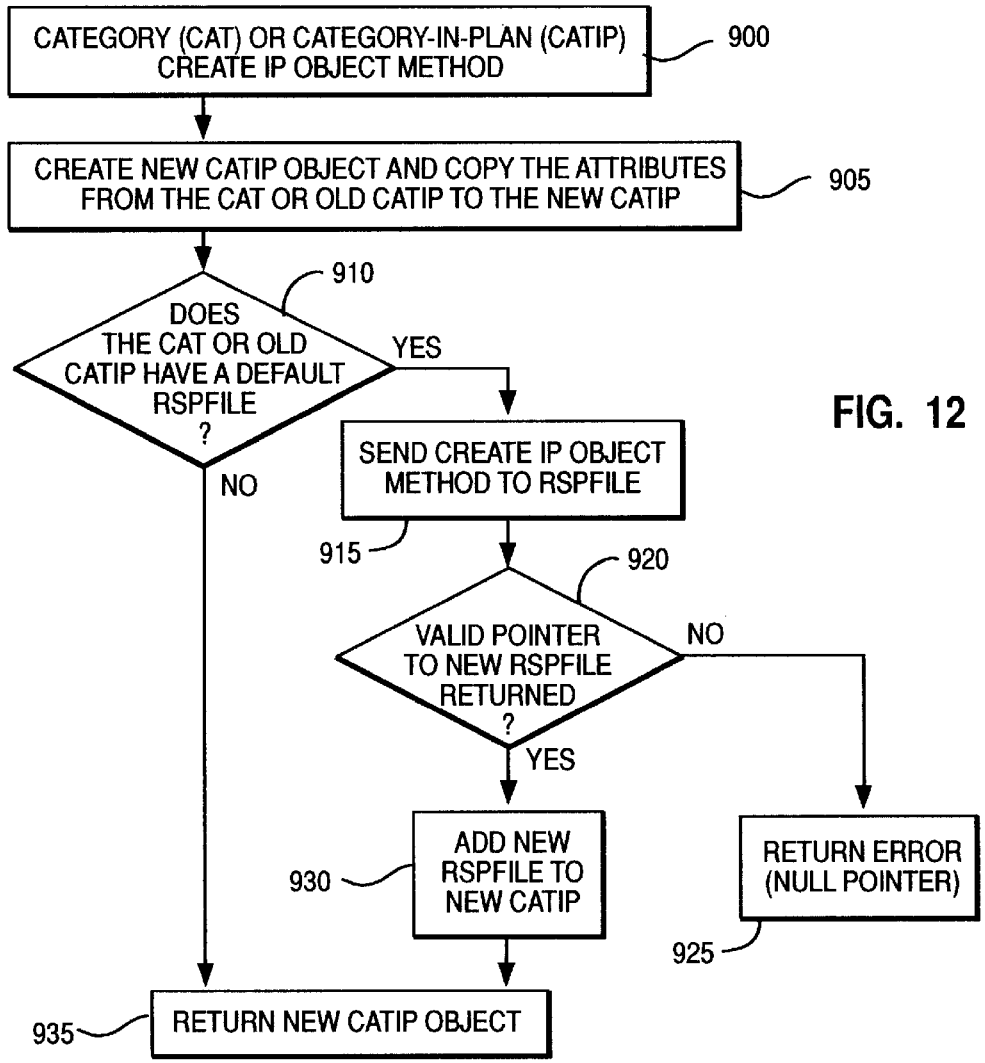
FIG. 12
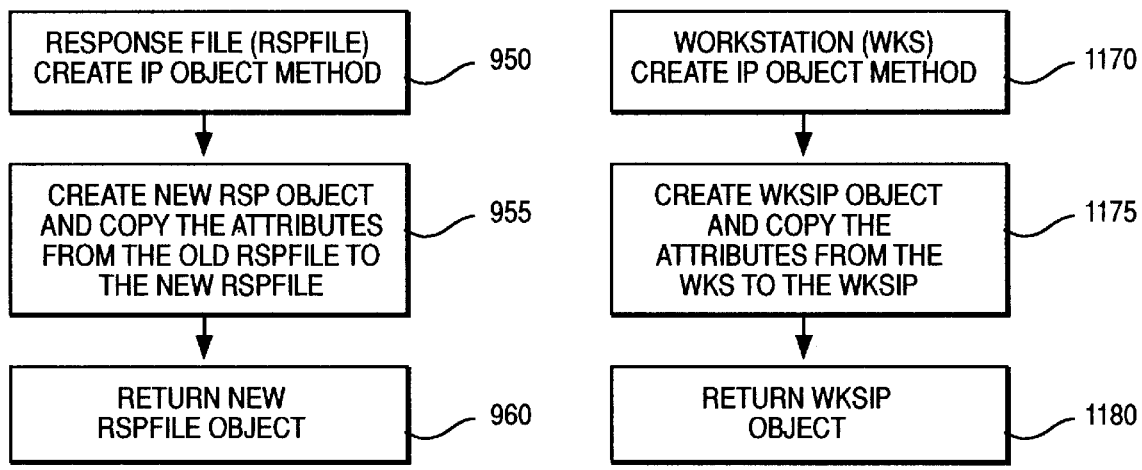
FIG. 13
FIG. 16

INSTALL PLAN OBJECT FOR NETWORK INSTALLATION OF APPLICATION PROGRAMS

This is a continuation of application Ser. No. 08//416,666 filed Apr. 5, 1995 now abandoned.

CROSS REFERENCE TO RELATED APPLICATION

This application is related to co-pending application entitled "Committing An Install Plan Object for Network Installation of Application Programs," Ser. No. 08/417,162, filed on the same date as this application, and hereby incorporated by reference. This Application and the co-pending application are assigned to the same assignee.

BACKGROUND OF THE INVENTION

This invention relates generally to electronic distribution of software in computer networks. More particularly, the invention relates to defining and constructing a proposed plan object for installing the software on the network.

It is common to couple a plurality of data processing systems interconnecting computing networks such as a Local Area Network (LAN) or a Wide Area Network (WAN). Each of the computer systems will have a plurality of software programs resident. In the infancy of such networks, a network administrator sat at each workstation with a set of diskettes and manually entered the parameters for each software product which needed to be installed, configured or maintained. With only a few workstations, administrators and users could afford to manually feed disks into their workstations and answer prompted questions during the installation or configuration process. As the size of the network increased, it naturally became more difficult to install software in such a manner. As the size and complexity of the network and the number of interdependencies between computer software products increased, configuring each workstation became an increasingly complex, time consuming, error prone process. Administrators could no longer afford this manual route and instead turned products specifically designed to install and configure applications on workstation over the network.

It has therefore become increasingly accepted to install computer software and configure workstations remotely. One accepted term for this process is electronic software distribution (ESD) The electronic distribution of software within a network has been known in the art for almost a decade. Some of the more popular ESD products include: NetView Distribution Manager and the LAN Configuration Installation Distribution utility, both from the IBM Corporation and the Network Navigator from Novell. These products are designed to alleviate the onerous tasks of software distribution, installation and configuration over the network.

Although ESD products have been in existence for a number of years, these products do not completely address all problems faced by the network which rapidly increased the burden on network administrator. One of the largely unaddressed problems faced by the network administrator is the planning and execution of the distribution, installation and configuration of plurality of software programs on a group of workstations in the network. Because of the growing number of interdependencies between software products and the complexity of the networks, this is a daunting task.

There have been prior efforts to alleviate the burden on the network administrator. Previous efforts concentrated more on the "plumbing" of network installation, such as how to transport the images across the network or the physical building of the files needed in the installation and configuration process. These designs helped the administrator in the physical tasks, e.g., transporting an application throughout the network, but did not help the administrator plan what the physical tasks should be.

The present invention decomposes the network installation and configuration planning process into a series of discrete objects that help to abstract the problem and provide an easy, object-oriented, and graphical means by which administrators can set-up and view the applications that are slated to be installed and configured on a set of workstations on the LAN. The administrator can use this object-oriented representation to create the files needed for the physical installation and configuration process. The present invention provides administrators with a higher level view of the problem, shielding them from most of the physical implementation and leaving them to concentrate on the building blocks for the plan. Administrators can use this design to create objects in the "playground" or non-plan area which serve as components to build the plan object.

The present invention represents an important improvement in electronic software distribution.

SUMMARY OF THE INVENTION

It is therefore an object of the invention to insulate the administrator from implementation details of the network install process.

It is another object of the invention to reuse objects within a graphical interface for a plurality of installation plans.

It is another object of the invention to create the files needed for the network installation process.

These objects and others are accomplished by an installation plan object is built for installing applications in a network. The empty installation plan object is first created from a template of a prototypical installation plan object. Next, from a workspace container object containing potential child objects of the installation plan object, objects are selected for inclusion in the installation plan object. The selected objects are transformed into child objects of the installation plan object. Selecting a object for the installation plan is conveniently performed by a drag and drop of an icon representing the selected object from a display area allocated to the workspace container object to a display area allocated to the installation plan object in a graphical user interface.

In the preferred embodiment, the objects which are selected to populate an install plan object must include an application object and a group object which respectively represent an application to be installed over the network and a group of workstations upon which the application is to be installed. After transformation, these objects are converted into an application-in-plan object and a group-in-plan object respectively. Other potential child objects include a category object having a plurality of response file objects each for installing a respective one of a plurality of applications over the network.

BRIEF DESCRIPTION OF THE DRAWINGS

These objects, features and advantages will be more readily understood with reference to the attached figures and following description.

FIG. 6 depicts the code server container object.

FIG. 12 depicts the process for generating a category-in-plan object.

FIG. 13 illustrates the process of transforming a response file to a response file in the installation plan object.

FIG. 16 shows process of creating a workstation-in plan-object.

DETAILED DESCRIPTION OF THE DRAWINGS

The invention may be run on a variety of computers or collection of computers under a number of different operating systems. The computer could be, for example, a personal computer, a mini computer, mainframe computer or a computer running in a distributed network of other computers. Although the specific choice of computer is limited only by disk and disk storage requirements, computers in the IBM PS/2 (TM) series of computers could be used in the present invention. For additional information on IBM's PS/2 series of computers, the reader is referred to *Technical Reference Manual Personal Systems/2 Model* 50, 60 *Systems* IBM Corporation, Part No. 68X2224 Order Number S68X-2224 and *Technical Reference 2 Manual Personal Systems/2* (Model 80) IBM Corporation Part No. 68X 2256 Order Number S68X-2254. One operating system which an IBM PS/2 personal computer may run is IBM's OS/2 2.0 (TM) for more information on the IBM OS/2 2.0 Operating System the reader is referred to OS/2 2.0 *Technical Library, Programming Guide Vol.* 1, 2, 3 *Version* 2.00 Order Nos. 10G6261, 10G6495, 10G6494.

In the alternative, the computer system might be in the IBM RISC System/6000 (TM) line of computers which run on the AIX (TM) operating system. The various models of the RISC System/6000 is described in many publications of the IBM Corporation for example, *RISC System/6000, 7073 and 7016 POWERstation and POWERserver Hardware Technical reference*, Order No. SA23-2644-00. The AIX operating system is described in *General Concepts and Procedure—AIX Version* 3 *for RISC System/6000* Order No. SC23-2202-00 as well as other publications of the IBM Corporation.

Figure 1:
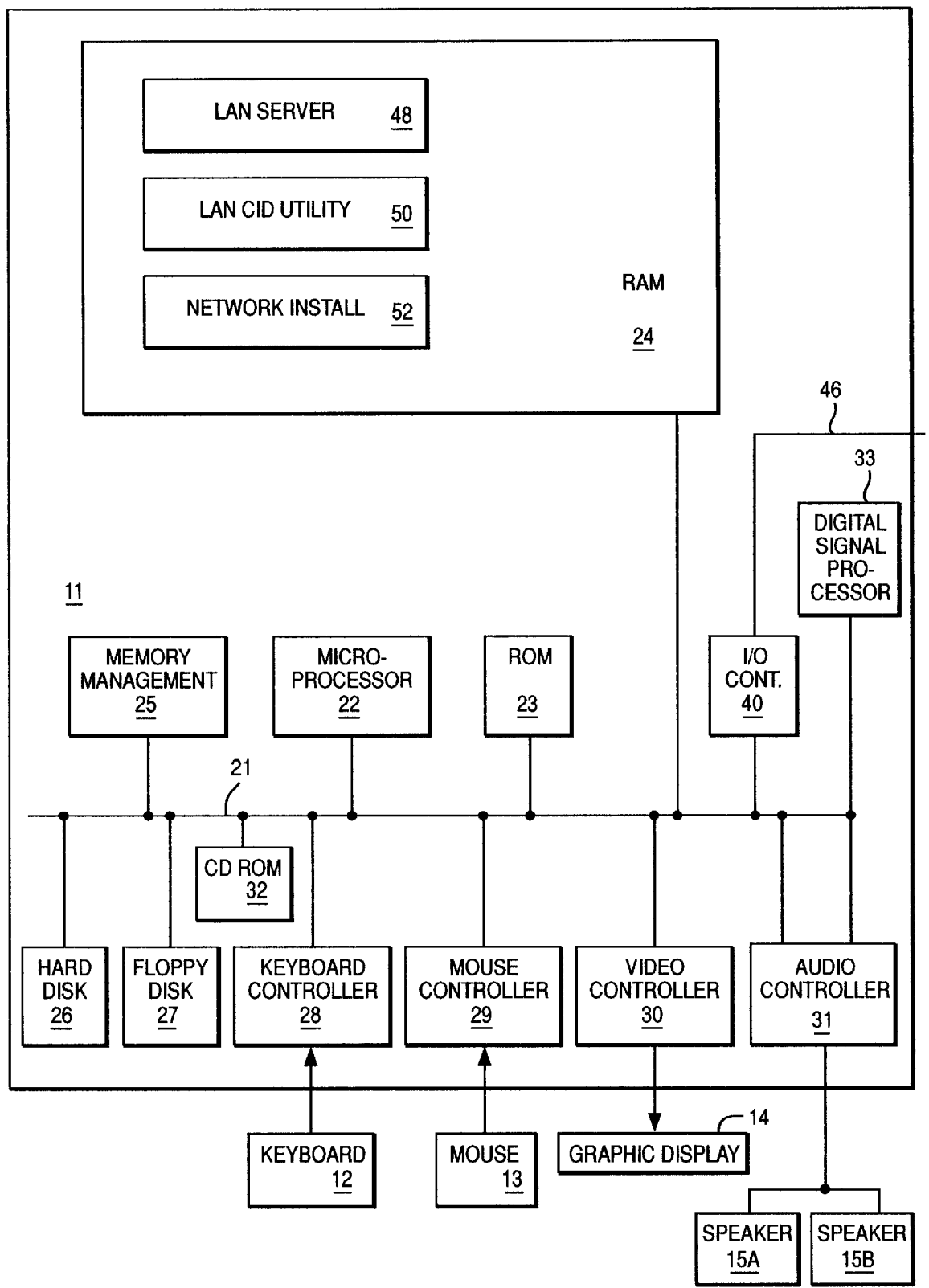
FIG. 1 depicts a computer system configured according to the teachings of the present invention.

In FIG. 1, a computer 10, comprising a system unit 11, a keyboard 12, a mouse 13 and a display 14 are depicted in block diagram form. The system unit 11 includes a system bus or plurality of system buses 21 to which various components are coupled and by which communication between the various components is accomplished. The microprocessor 22 is connected to the system bus 21 and is supported by read only memory (ROM) 23 and random access memory (RAM) 24 also connected to system bus 21. A microprocessor in the IBM PS/2 series of computers is one of the Intel family of microprocessors including the 386 or 486 microprocessors. However, other microprocessors including, but not limited to, Motorola's family of microprocessors such as the 68000, 68020 or the 68030 microprocessors and various Reduced Instruction Set Computer (RISC) microprocessors such as the PowerPC chip manufactured by IBM, or others by Hewlett Packard, Sun, Motorola and others may be used in the specific computer.

The ROM 23 contains among other code the Basic Input-Output system (BIOS) which controls basic hardware operations such as the interaction and the disk drives and the keyboard. The RAM 24 is the main memory into which the operating system and application programs are loaded. The memory management chip 25 is connected to the system bus 21 and controls direct memory access operations including, passing data between the RAM 24 and hard disk drive 26 and floppy disk drive 27. The CD ROM 32 also coupled to the system bus 21 is used to store a large amount of data, e.g., a multimedia program or presentation.

Also connected to this system bus 21 are various I/O controllers: The keyboard controller 28, the mouse controller 29, the video controller 30, and the audio controller 31. As might be expected, the keyboard controller 28 provides the hardware interface for the keyboard 12, the mouse controller 29 provides the hardware interface for mouse 13, the video controller 30 is the hardware interface for the display 14, and the audio controller 31 is the hardware interface for the speaker 15. An I/O controller 40 such as a Token Ring Adapter enables communication over a network 46 to other similarly configured data processing systems.

One of the preferred implementations of the invention is as sets of instructions 50 resident in the random access memory 24 of one or more computer systems configured generally as described above. Until required by the computer system, the set of instructions may be stored in another computer memory, for example, in the hard disk drive 26, or in a removable memory such as an optical disk for eventual use in the CD-ROM 32 or in a floppy disk for eventual use in the floppy disk drive 27. One skilled in the art would appreciate that the physical storage of the sets of instructions physically changes the medium upon which it is stored electrically, magnetically, or chemically so that the medium carries computer readable information. While it is convenient to describe the invention in terms of instructions, symbols, characters, or the like, the reader should remember that all of these and similar terms should be associated with the appropriate physical elements. Further, the invention is often described in terms of comparing or validating, or other terms that could be associated with a human operator. No action by a human operator is desirable in any of the operations described herein which form part of the present invention; the operations are machine operations processing electrical signals to generate other electrical signals.

The network in which the workstation is integrated is a Local Area Network (LAN) or a Wide Area Network (WAN), the latter comprising a teleprocessing connection to other nodes or a network of systems operating under a known computer architecture. At any of the nodes, there may be one or more processing systems each of which may be a single user or a multi-user system configured more or less as described above. These processing systems operate as a client or server workstation depending upon whether it is requesting or supplying services. In one particular implementation, the invention runs on a plurality of IBM compatible workstations interconnected by the IBM OS/2 LAN Server architecture including LAN Server 48, the LAN CID Utility 50 and the Network Installation Application 52 in which the present invention is implemented. These applications may be packaged together with other applications or sold as separate applications. A simplified description of local area networks may be found in a book by Larry E. Jordan and Bruce Churchill entitled: *Communications and Networking For The IBM PC* Published by: Robert J. Brady (A Prentice Hall Company 1983). The simplest configuration for the administrator would be to have one code server on the LAN and have the network installation program running on that workstation. This design does not preclude the administrator from having more than one code server defined on the LAN.

One of the methods of Configuration, Installation and Distribution (CID) which have been defined by the IBM Corporation is based on the use of response files and combination with a product's own installation program. In the CID process, a network administrator selects one or more machines in the network as a code server from which other workstations in the network receive the computer software, including the response files. A response file is a flat ASCII file that contains a set of responses to a corresponding set of questions asked by the program during the installation and/or configuration process. More information on the CID process of a general nature can be found in LAN Configuration Installation and Distribution Utility Guide, Order No. S10H-9742-00 a publication of the IBM Corporation. The program module which automates the redirected installation configuration is called the LAN Configuration Installation Distribution Utility (LCU). An LCU command file identifies the products which the network administrator plans to install on a workstation. Administrators can have separate LCU command files for each workstation on a network as well as the order in which the products should be installed or configured. A response file contains information needed for installing a software product on the workstation. Administrators can have one response file per application, but that "one" response file can include additional embedded response files if supported by the application's install or configure program. Response files may be shared between workstations if there is no workstation specific information. They are to be reinstalled or configured with the same rules, but response files cannot be shared between applications. Other files generated include a configuration file which is used to configure the code server and a authorization list file which is used to give clients access to the code server. Application Images are installed on the code server from which the applications are installed. The LAN CID Utility procedures which track the current state of installation ensure that each step is running in the proper sequence. The above referenced application describes how the installation plan object can be used to provide files for the LCU installation engine. One skilled in the art would understand that this environment is only one of many possible in which the present invention could be implemented.

An important aspect of the invention is that the install plan object and its subcomponents are implemented in an object oriented system. While objects and object oriented programming are known, a few facets are worth mentioning at this time. Each object has certain data attributes and methods which operate on the data. Data is said to be "encapsulated" by an object and can only be modified by the method which belongs to the object. Methods are typically invoked by sending a message to an object, identifying the desired method and supplying any needed arguments. Class objects can be subclassed to create new class objects. "Inheritance" is the ability to derive a new object from an existing object inheriting all properties such as methods and data structure from the existing object. The new object may have certain unique features such as new methods which are added to or override existing methods of the existing class. A new subclass needs only specify the methods and data which distinguish it from its already existing base class. Thus, the software developer does not need to develop an entirely new piece of code. He or she need only specify the new unique features of the software. For background information on object oriented technologies, concepts and conventions, the reader is referred to publications such as *Object Oriented Design With Applications*, by Grady Booch (The Benjamin/Cummins Publishing Company, 1990) and *Object Oriented Software Construction*, by B. Meyer, (Prentice Hall, 1988). For the present invention, the object oriented nature of the install plan and its components allows the reuse of the base application and workstation objects by creating instances of those objects for multiple plan objects or group objects.

Figure 2A:
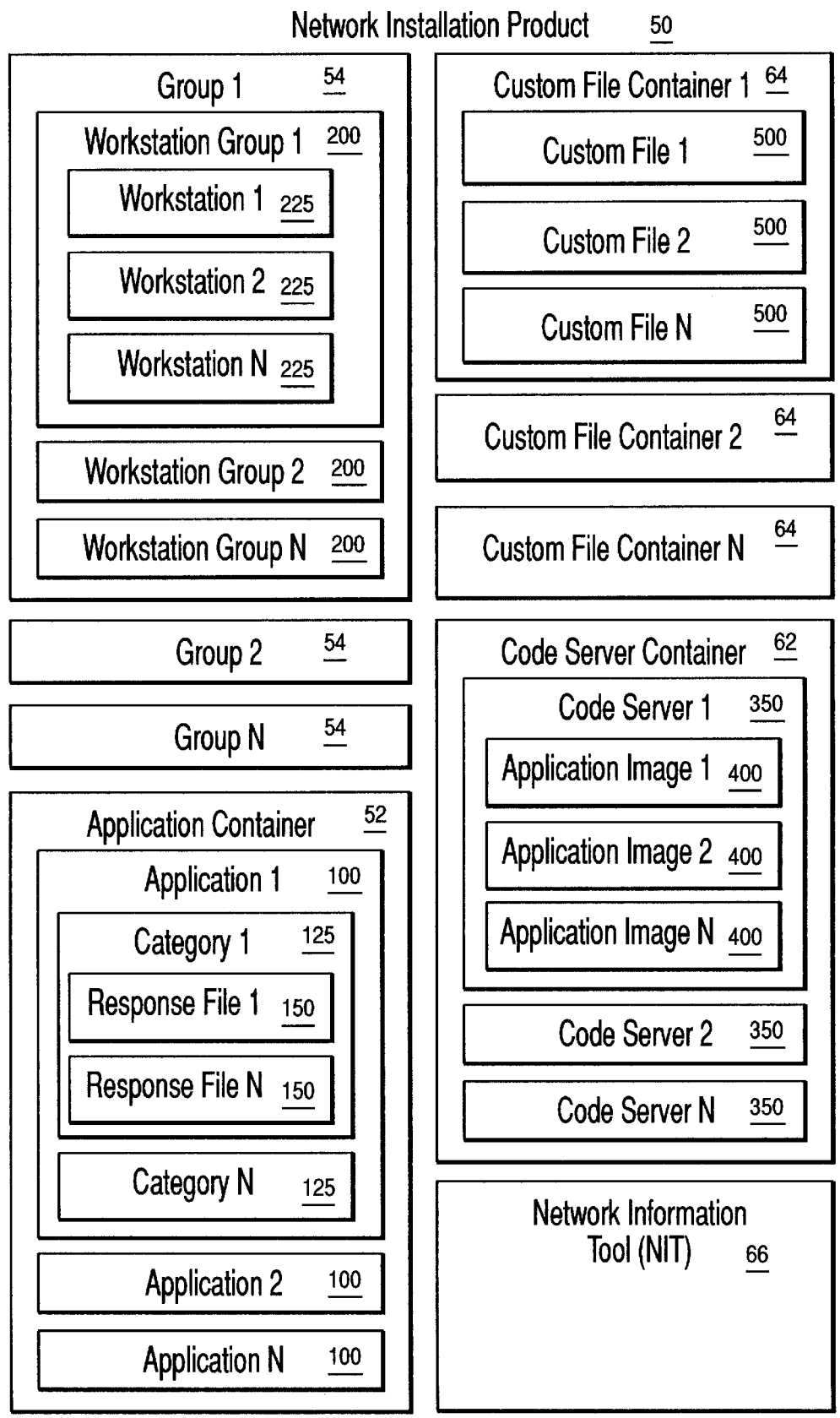
FIG. 2 depicts the overall hierarchy of objects in the network installation product.
Figure 2B:
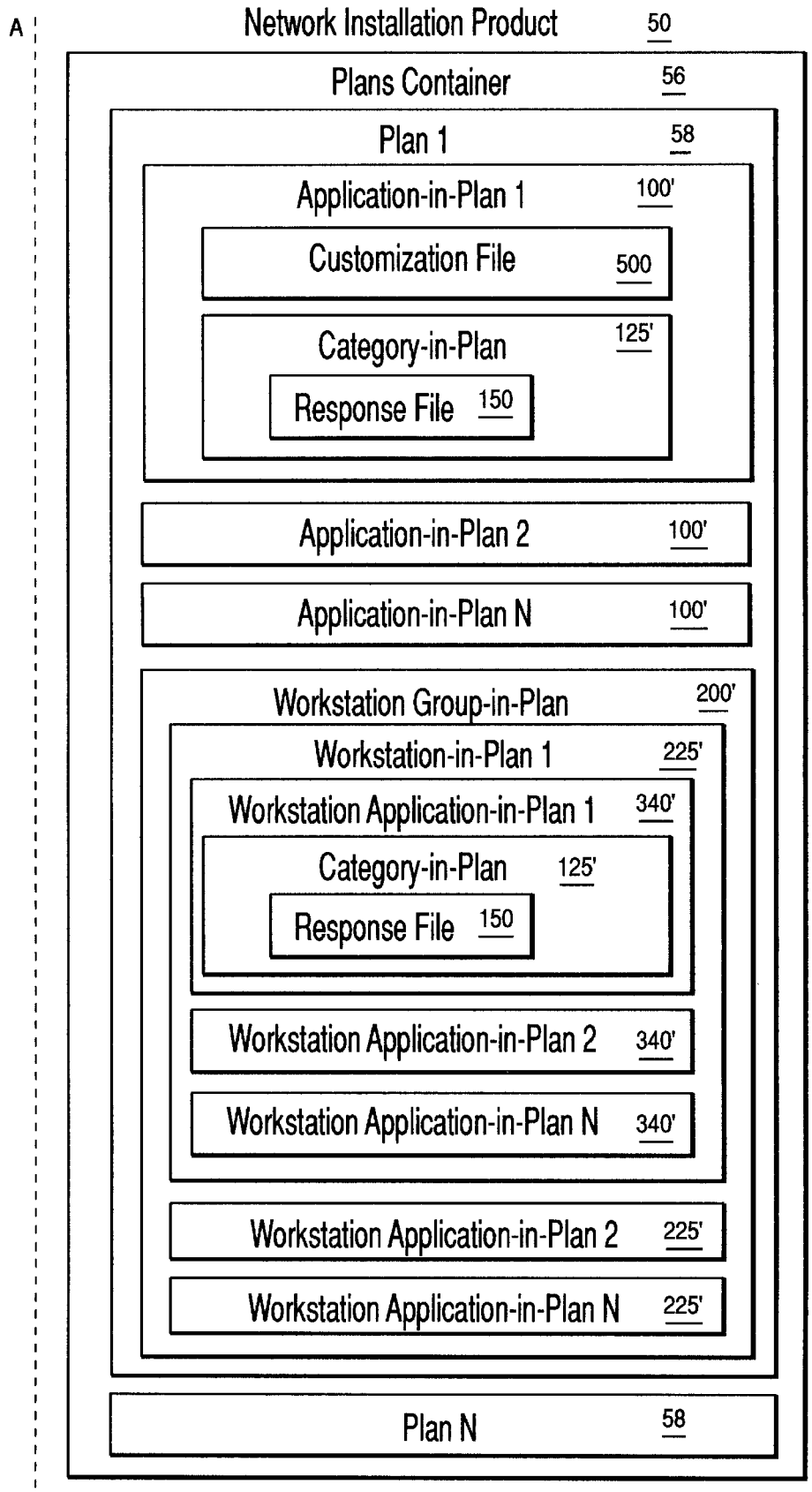

FIG. 2 depicts the objects in the network installation product 50 of the present invention. The objects at the top of the hierarchy include the application container 52, the group objects 54, the plans container 56, the code server container 62, the custom file containers 64 and the network information tool 66. These objects will be discussed briefly in connection with this figure and in greater detail below in connection with FIGS. 3–8.

The Application Container 52 holds one or more Application objects which are predefined in the Network Installation Program. Each application object represents a potentially installable application using the network installation product. Typically, a number of application objects are predefined in the network installation product. The invention also allows the addition of new application objects which were defined by the administrator for the installation of new applications.

The Group Container 54 is used to hold one or more workstation Group objects 200 which are defined by the administrator. Workstation Group objects 200 contain Workstation objects 225 which represent workstations which are to be installed with similar software. Workstation group objects are among the components used by the administrator to build a Plan object 58. The installation or configuration of applications within a group of workstations is represented by the association of application objects in the workstation group object.

The plans container 56 containe a plurality of plan objects 58 which in which both the application-in-plan objects and the workstation group-in-plan objects to which the plan pertains. The code server container object 62, contains one or more code server objects which contain the application images used in the electronic software distribution process. The customization file container 64, holds one or more customization file objects 500 which the administrator can apply to a generic response file object to create unique generated response files for particular workstation. The network information tool 66 is used to determine the status of a committed plan object 58.

Figure 3:
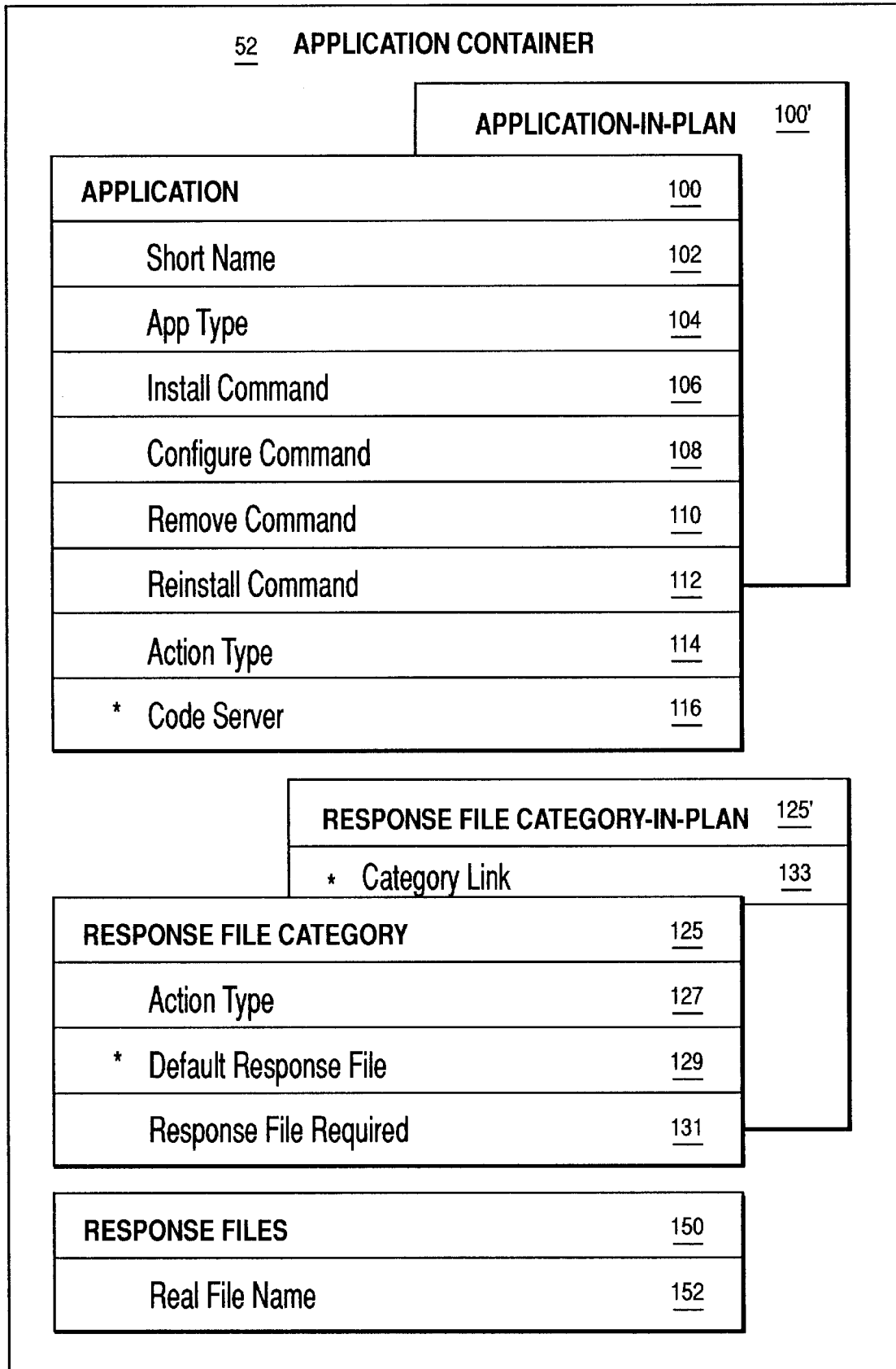
FIG. 3 depicts the application object.

FIG. 3 depicts an application object (App) 100 and application-in-plan object (AppIP) 100' in greater detail. An application object represents an application which is to be installed and configured over the network using the network installation program Note that the invention distinguishes between non-IP and IP objects by making them separate class objects, e.g., App and AppIP objects. In another embodiment of the invention, AppIP objects could be of the same App class type, but have their actions, attributes, and behavior differ depending upon the parent object of the App object, i.e. plan object or playground object. For example, a category object that is not a member of a Plan object would allow more than one response File object to belong to it. A category object that is a member of a Plan object, e.g., it belongs to an App object that is part of a Plan object, would not allow more than Rsp File object to belong to the Cat object.

An Application object 100 is associated with a Workstation Group object to build a Plan object. Application and application-in-plan objects 100, 100' have a series of attributes to define the application object instance. The Short Name attribute 102 is used to uniquely identify the object within the Network Installation Program. The App type attribute 104 identifies this application as an operating system, transport, corrective service, maintenance system or a general application. The Installation, Configuration, Removal or Reinstallation commands attributes 106-112 provide the means to process the application-in-plan object on the workstation-in-plan objects in the workstation group-in-plan object in the Plan object. These attributes help to uniquely identify the application from other applications and to specify the commands to execute for the specified action, e.g., installation or configuration The action type attribute 114 denotes the type of processing for this application, i.e. install, configure, remove, reinstall, or maintenance system using their respective commands. The code server attribute 116 is the link back to a code Server object where the application image for the application instance resides.

For application objects 100 which support response files, response file category objects 125 group application response files 150 of homogeneous action types. There may be one set of response files that can apply to the installation of applications and a different set that can apply to configuration of applications. Typically, the category object 125 groups the different response files by the application's Action Type attribute 127. The Action Type attributes 127 attributes are the type of actions for which response files were written, e.g., install, removal, configuration, reinstallation, for this category of response files. The selections for the action type attribute 127 correspond to the same selection list as the Action Type attribute 114 on an Application object 100 above. The Default Response File attribute 129 is an object pointer which identifies the response file to be used by the application if a response file is not identified. This is the link back to a Response File 150. The Response File Required attribute 131 indicates if a response file is required by the application during processing. The category-in-plan object must typically include at least one response file object to be included in the plan object.

The Response File Category-in-Plan object 125' is a Response File Category object that has been committed to a plan and therefore cannot be changed. It is associated with an Application-in-Plan object 100'. The Category Link attribute 133 stores a pointer back to the Category object 125 from which the Category-in-Plan object 125 was created.

For applications which support response files, the response files objects 150 are used to supply answers to questions which would typically be requested through product panels during the course of an installation or configuration of the application. For example, the installation program may normally prompt for the directory in which to install the application. This directory could be specified in a response file object, thus forgoing the need to prompt the administrator. The Real File Name attribute 152 is the fully qualified path to the response file to be used during the processing of the application. A "fully qualified path" may be written as a file name with a full directory specification.

Figure 4:
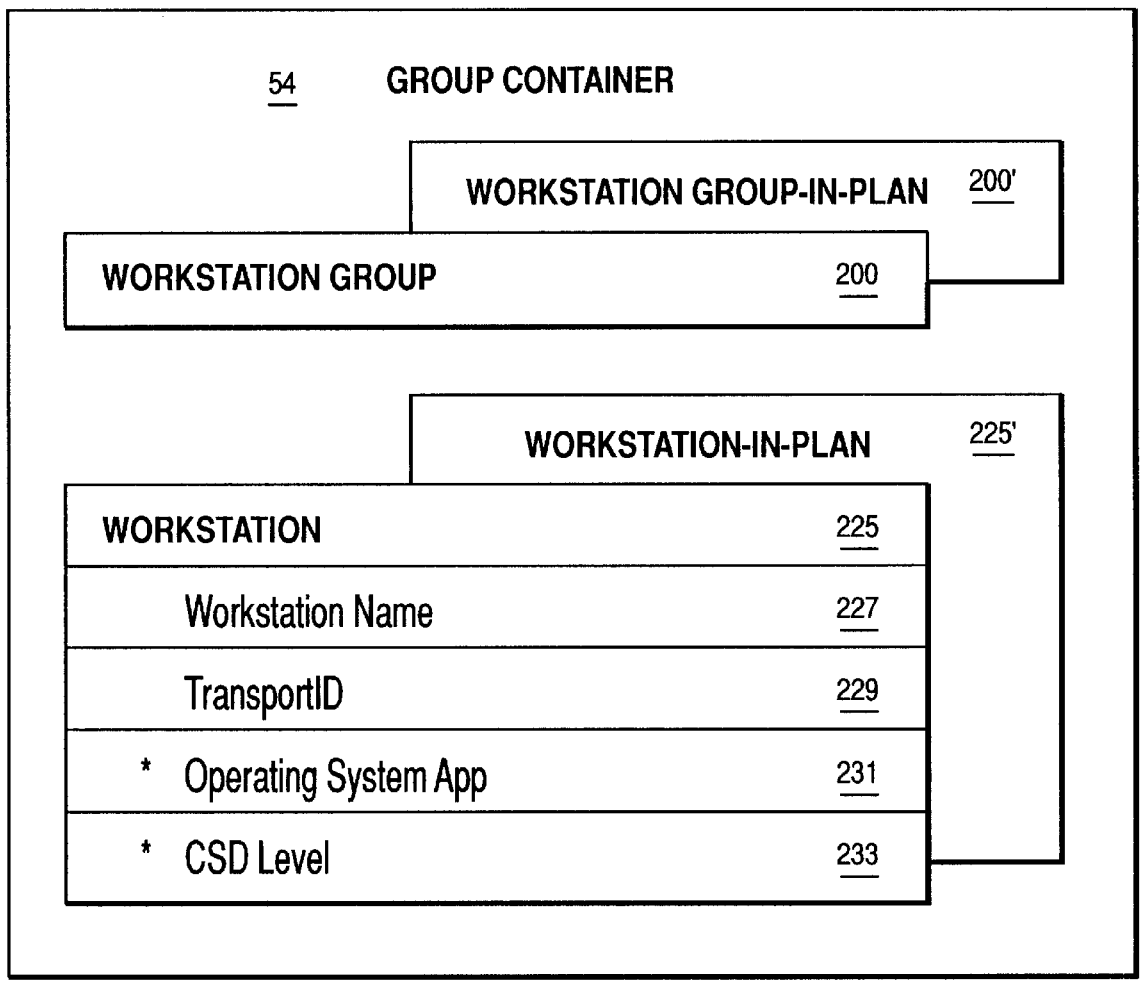
FIG. 4 depicts the workstation group and group-in-plan objects.

FIG. 4 depicts the workstation group and workstation group-in-plan objects. The Group Container 54 is used to hold one or more workstation group object 200 which are defined by the administrator. The workstation group objects 200 contain workstation objects 225 which are to be installed with similar software. Workstation group objects 200 are used by the administrator to define sets of one or more workstation objects 225 which are to have similar application sets installed. Workstation group objects are also used by the administrator to build a Plan object in which the groups of workstations are associated with the applications to be installed. As will be explained in connection with a preferred graphical user interface shown in FIG. 17, administrators can build a plan object by creating a new plan object and dragging workstation group objects and application objects from a playground area and dropping these objects on the new plan object.

A Workstation Group-in-Plan object 200' is a group of workstation-in-plan objects 225' which were created as part of the Plan object by adding a workstation group object 225 to the Plan object. The actual transformation processes to convert the various objects to in-plan objects are described below in connection with FIGS. 11–16.

The workstation object 225 represents a physical workstation in a network for which remote installation, configuration, removal, or reinstallation of applications is to be performed. Instances of workstation objects 225 are created within workstation groups 200 based on the type of software applications which are planned to be processed for the actual workstation. If a workstation is to be represented in more than one workstation group object, a shadow of that workstation is created in the second workstation group object. The workstation objects 225 also have a plurality of attributes which help uniquely identify the workstation and its configuration. The Workstation Name attribute 227 is the unique name to identify the workstation object to the external installation programs. The Transport ID attribute 229, is the UserID to be used during the logon portion of the processing. This ID is used to identify the type of transport to be used when installing application images at the workstation. Although only one ID is shown the administrator may specify a different UserID for the different types of transports available on the network. This value is used for the install of applications at logon to the workstation. The Operating System App attribute 231 is the link back to an Application object. This is the operating system currently installed on the workstation. The CSD Level attribute 233 is the corrective service level of the operating system on the workstation. Both the operating system App and CSD level attributes link back to application objects in the application container. If specified, the CSD level attribute 233 links to an application with an application type attribute of corrective service. The operating system app attribute 231 links back to an application with an apptype attribute of operating system. The Workstation-In-Plan object 225' is the Workstation object after it has been dropped into a plan. The asterisks next to attribute names in the Figures indicate that the attribute shares a pointer to link the object to another object in the Network Installation Program.

Figure 5:
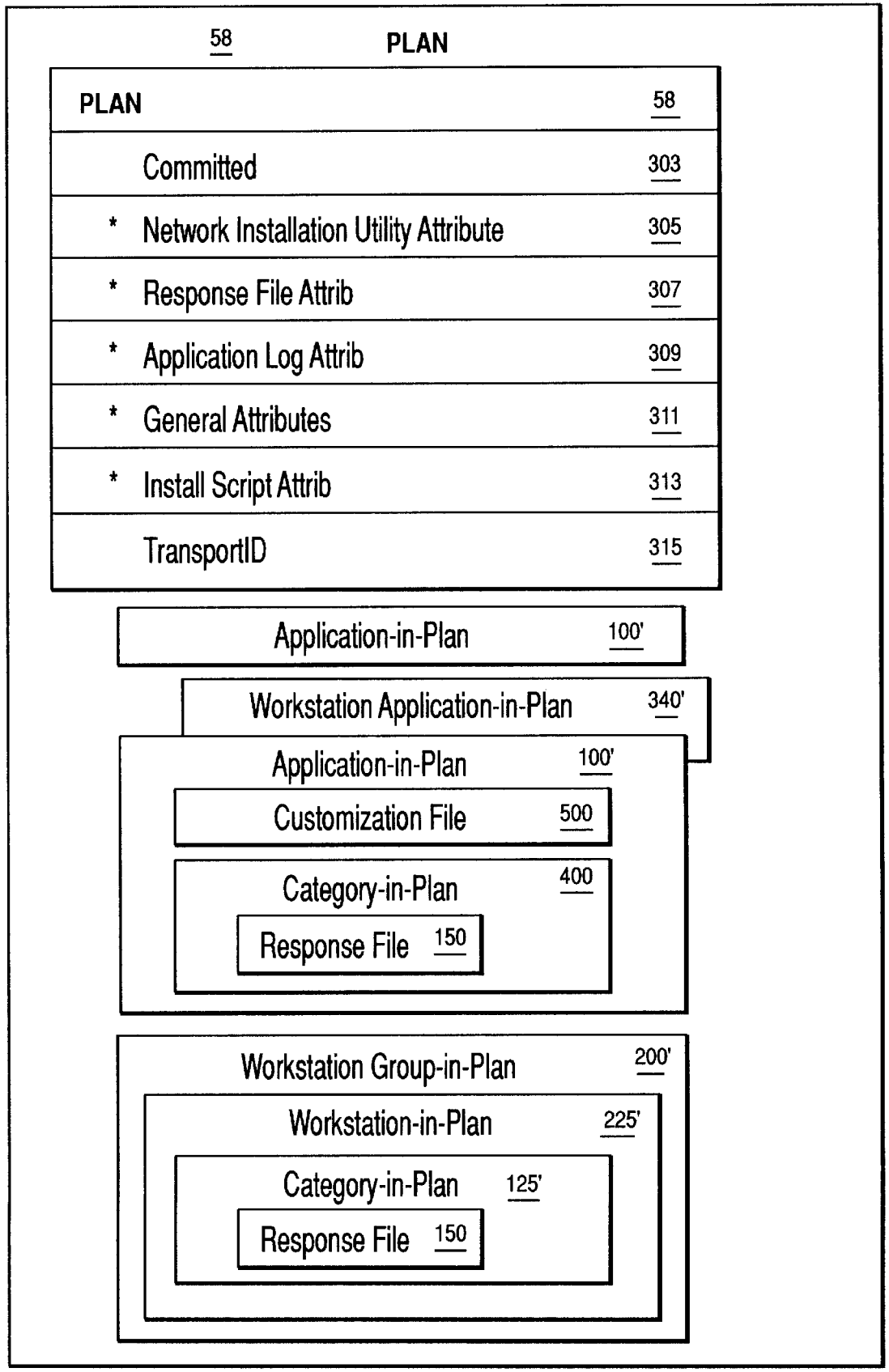
FIG. 5 depicts the plan object.

FIG. 5 depicts the Install Plan object 58 and its components and is central to the network installation program of the present invention. The Plan object 58 defines the application-in-plan objects 100' which are to be associated with a workstation group-in-plan object 200'. A group object 200 and one or more application objects 100 can be dropped on a Plan object 58 to make the association between the objects. In the preferred embodiment, there can be only one group-in-plan object 200' in a Plan object 58, the application objects dropped on a Plan object are associated with all the workstations in the group-in-plan object 200. The application-in-plan objects 100' are transformed into workstation application-in-plan objects which are children of the workstation-in-plan objects as shown in FIG. 2. They are shown as shadows of the AppIP objects as they inherit most of their attributes. An alterative embodiment would allow more than one group object per plan object, however, this would complicate the planning process as all the workstations in the plan must have unique workstation names and greater precision is required in dropping the application objects.

Plan objects are committed to initiate the process of generating Response Files and Install Scripts. A Plan object 58 can only be committed if it is valid. In the preferred embodiment, a valid plan object includes: at least one application-in-plan object 100'; at least one group-in-plan object 200' and at least one workstation-in-plan object 225' in the group-in-plan 200'. The commit process and the validation process for an install plan object is described in much greater detail in the above referenced and incorporated application, "Committing an Install Plan Object for the Network Installation of Application Programs".

The install plan object 88 has a plurality of attributes which facilitate the network installation process. The committed attribute 303 is a flag to denote that this plan is valid and has been committed. The Network Install Utility, attribute 305 indicates the Code Server object and directory where utilities used by the Network Install program can be found. The Response File Attributes 307 indicate the Code Server object and the directory path where the generated response files are stored so that the client workstations in the plan can locate them. The Application Log Attribute 309 indicates the code server object and the directory path where logs generated by the installation and configuration of applications should be stored. The general attributes 311 indicate the code server object and optionally the directory path where general files used by the applications' installation and configuration programs are located. The Install Script attribute 313 indicates the code server object and optionally the directory path where the client workstations can access their install script files which indicate the commands and order in which applications should be installed and configured on workstations. The Transport ID 315 is the guest UserID to be used by the client workstation in the Plan object to access the code servers specified in the Plan object. This value is optionally supported by the administrator, but if it was specified, it can be a different value for the different types of transports available on the network. This is true for the workstation and workstation-in-plan objects as well.

The code server container object 62 may contain one or more code server objects 350. FIG. 6 depicts the code server container object 62 with a code server object 350 and an application image object 400. The code server object represents a physical file server machine which store the application images and which is to be accessed by client workstations during an installation, configuration, reinstall or removal of application software. The code server also contains directories to the various command and response files needed to perform the remote installation. The Code Server object 350 encapsulates the data and methods needed to discover where installable code images are located and to build network file system attach commands for those code images. It can also be used to store generated response files and output log files. It is a container for application images 400.

The code server attributes are as follows: The Alias Name attribute 351 is the access point from the client workstation's perspective where the application images resides. The Alias Drive attribute 353 is the physical path to the application image at the code server. The Server Name attribute 355 is the unique name for the code server and it is used to connect a workstation to the code server during processing. The Redir attribute 357 is the redirection type on which the server shares files. The Transport Type attribute 359 is the application which will be used by the client workstation to access the code server. This is a link back to an Application Object with an App Type of Transport.

The Application Image object 400 represents the image of an application product that is available for installation or configuration from a code server. The Application Directory attribute 401 is the starting directory path where the images may be found. The Application Name attribute 403 is the link back to an Application object that resides in the Application Container object. An Application Image object 400 cannot be defined without the Application object for the product being defined and residing in the applications container in the Network Installation Program. The Application Alias attribute 405 is the alias name by which the image may be accessed.

Figure 7:
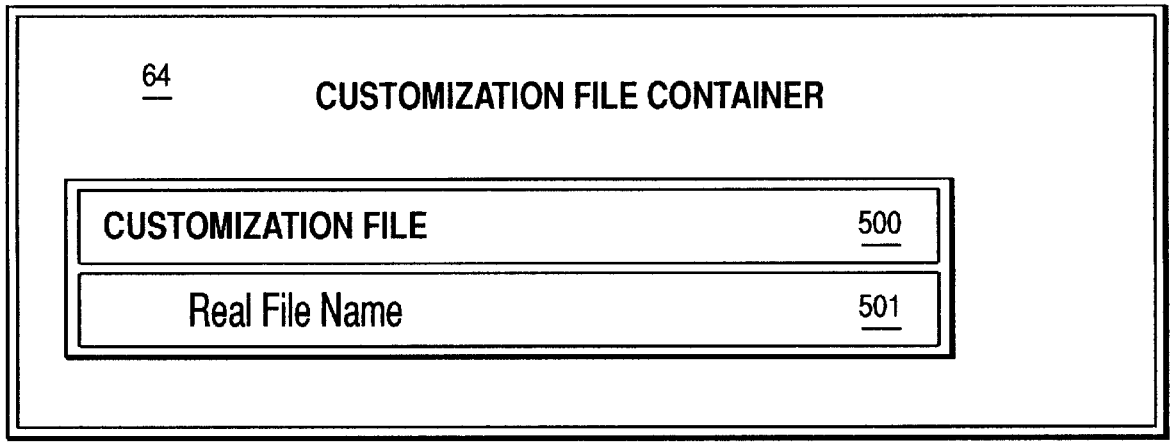
FIG. 7 depicts the customization container object.

Customization file containers 64, as depicted in FIG. 7, may be created to hold one or more customization file objects 500 which the administrator has defined. In one preferred embodiment, customization file objects 500 contain a matrix of workstation names on the Y axis and keywords on the X axis. The intersection of a workstation row and keyword column is the value that should be substituted for the corresponding keyword value in the workstation's response file that is associated with an application. One skilled in the art would appreciate that other tabular means of encapsulating the customization data are possible. At the time a Plan object is committed, the model response files are resolved with the customization files to create unique generated response files for each workstation. Customization files may be applied to an application-in-plan object. The Real File Name attribute 501 is the fully qualified path and file name to the customization file.

Figure 8:
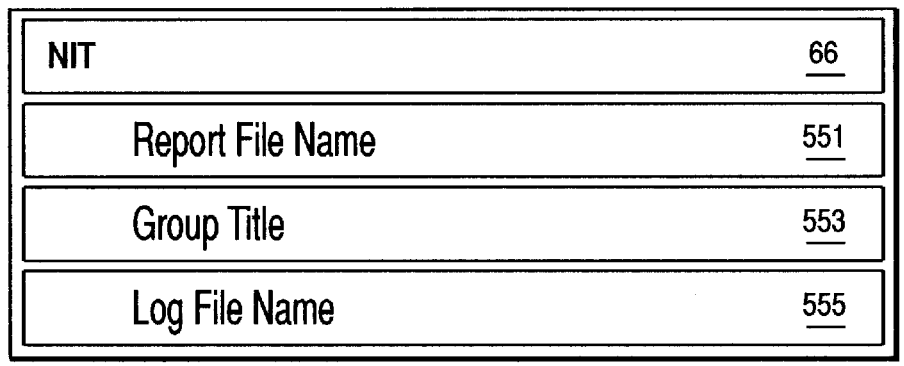
FIG. 8 depicts the network information tool object.

The Network Information Tool (NIT) object 66 shown in FIG. 8 is used to determine the status of a committed plan object. The status can be determined via individual workstation object or by plan object. Administrators would use the NIT object to get feedback as to the success or failure of Committed Plans by selecting the plan or workstation from a list of such objects depicted in the NIT. One sample interface is depicted in FIG. 18. The Report File Name attribute 551 is the fully qualified file name of the status file. The Group Title attribute 553 is the name of the plan to which the Report File Name pertains. The Log File Name attribute 555 is the fully qualified name for the log file that is generated as a result of the plan processing.

Figure 9:
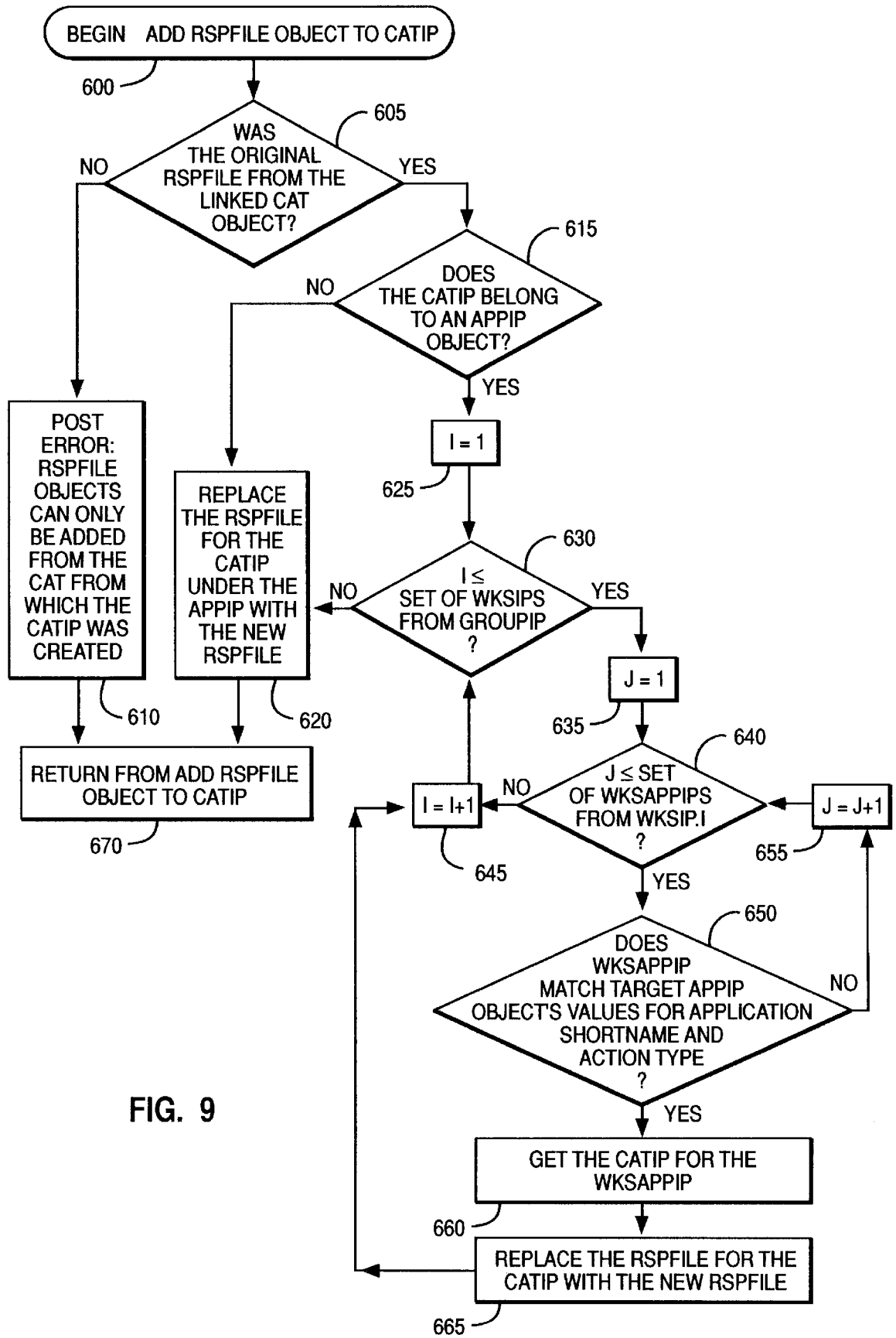
FIG. 9 is a flow diagram of the process to add a response file object to category-in-plan object.

The ADD RSPFILE OBJECT TO CATIP routine is shown in FIG. 9. This routine depicts the processing flow that occurs when the administrator tries to add a response file object (RspFile) to a category-in-plan (CatIP) object that may contained in an application-in-plan (AppIP) object or workstation application-in-plan (WksAppIP) object.

The routine begins with entry routine block 600 and continues to decision block 605 where the link attribute 133 to the CatIP is checked. This link attribute points back to a Category (Cat) object from which the original response file object to be added to the plan object was brought. If the RspFile object did not come from the Cat object, processing continues to step 610 where the network installation program will post an error stating that RspFile objects can only be added from the Cat object from which the CatIP object was created. This prevents the user from accidentally copying a RspFile object from the wrong Cat object to the target CatIP object. After posting this message, processing ends with return block 670. If the CatIP link attribute to the Cat object was valid, processing continues to decision block 615 where the parent object of the CatIP object is queried. If the parent object is not an AppIP object, which means it is a WksAppIP object, processing continues to step 620 where the old RspFile object for the CatIP object is replaced with the new RspFile object. Afterwards, processing ends with return block 670.

If the CatIP object belongs to an AppIP object, processing continues to step 625 where the I counter is set to 1. Next, decision block 630 checks to see if the I counter exceeds the number of workstation-in-plan (WksIP) objects in the group-in-plan (GroupIP) object. If it exceeds this number, processing continues to step 620.

If counter I is still below the number of WksIP objects, processing continues to step 635 where counter J is set. Next, decision block 640 checks to see if the J counter exceeds the number of WksAppIP objects in WksIP object indexed by the I counter. If it exceeds this number, processing continues to step 645 where counter I is incremented by 1.

If the J counter is less than or equal to the number of WksAppIP objects in WksIP object indexed by the I counter, processing continues to decision block 650 where the WksAppIP object referenced by the J counter in the WksIP referenced by the I counter is checked to see if the short name and action type attribute values match the same values in the AppIP object. If they do not match, processing continues to step 655 where the J counter is incremented by 1. If the attributes match, a pointer to the CatIP object belonging to the WksAppIP object is retrieved in step 660, and in step 665, the RspFile object belonging to the CatIP object pointed to from step 660 is replaced with the new RspFile object. After the new RspFile object is replaced, processing continues to step 645 and the next WksIP object is checked.

Figure 10:
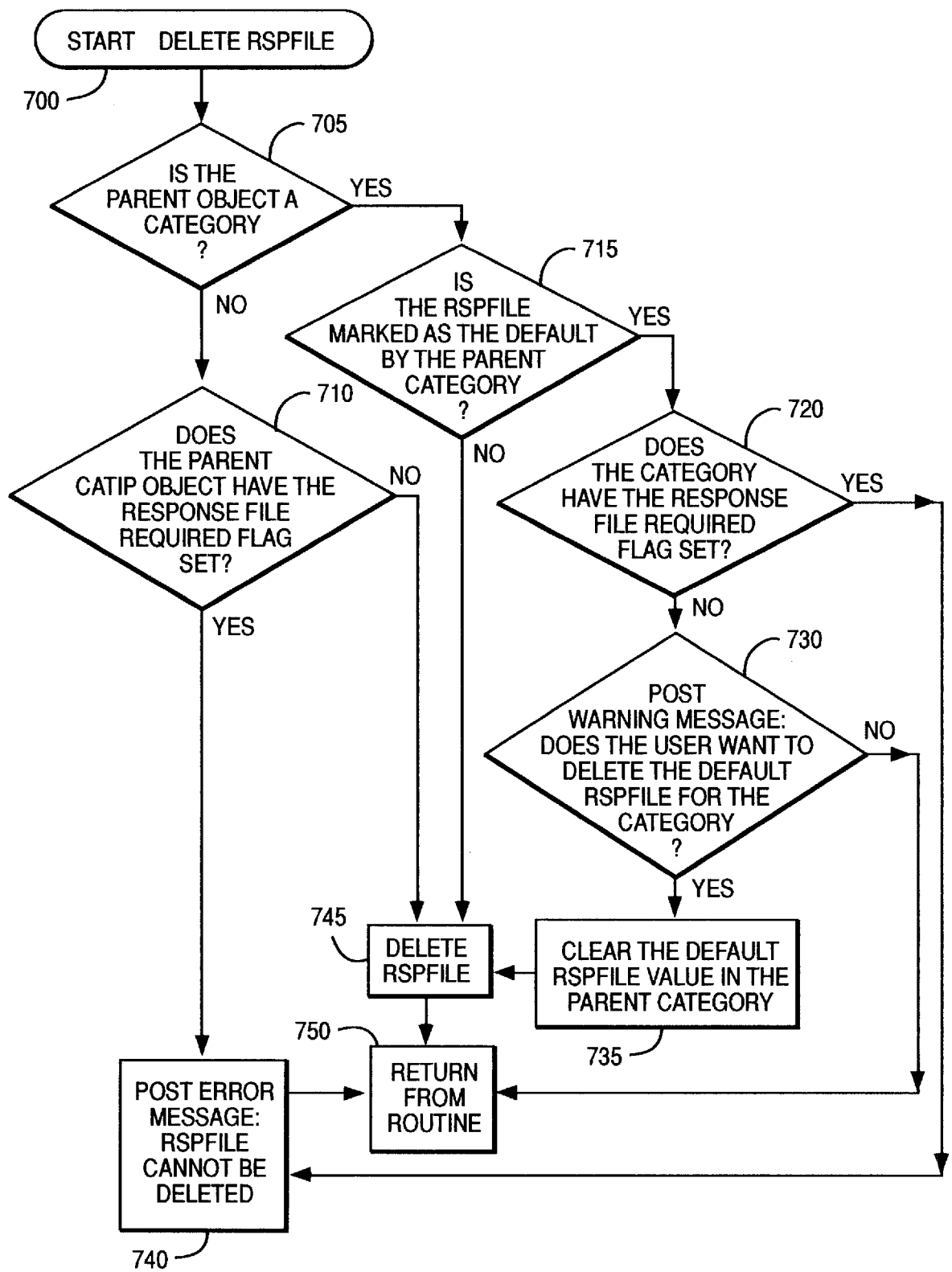
FIG. 10 is the process for deleting a response file from the network installation program.

The DELETE RSP FILE routine is shown in FIG. 10. This routine depicts the processing flow that occurs when the administrator tries to delete a RspFile from the network installation program. The routine begins with entry routine block 700 and continues to decision block 705 where the parent of the RspFile object is checked to see if it is a Cat object. If the parent is not a Cat object, it must be a CatIP object and processing continues to decision block 710 where the CatIP object is queried to determine if the Response File Required attribute flag is set. If this flag not set, the RspFile is deleted in step 745 and the routine ends in return block 750. However, if the flag was set, the network installation program will post an error message in step 740 indicating that the RspFile object cannot be deleted because it is required. Afterwards, the routine ends in return block 750. If the parent object is a Cat object in decision block 705, processing continues to decision block 715 where the default response file attribute 320 of the Cat object is checked to see if it matches the real file name of the RspFile object. If the file names do not match, the RspFile object is deleted in step 745, and the routine ends in return block 750.

If the two file names match, processing continues to decision block 720 where the Cat object is queried to determine if the Response File Required attribute flag is set. If the flag was set, the network installation program will post an error message in step 740 indicating that the RspFile object cannot be deleted because it is required. If the flag was not set, the network installation program will post a warning message in decision block 730. This warning message will ask the administrator if the default RspFile object should be deleted. If the administrator does not want to delete the default RspFile, processing ends with return block 750. However, if the user wants to delete the default RspFile object, processing continues to step 735 where the default rspfile attribute for the present category object is checked. Next, processing entries to step 745 where the RspFile object is deleted.

Figure 11:
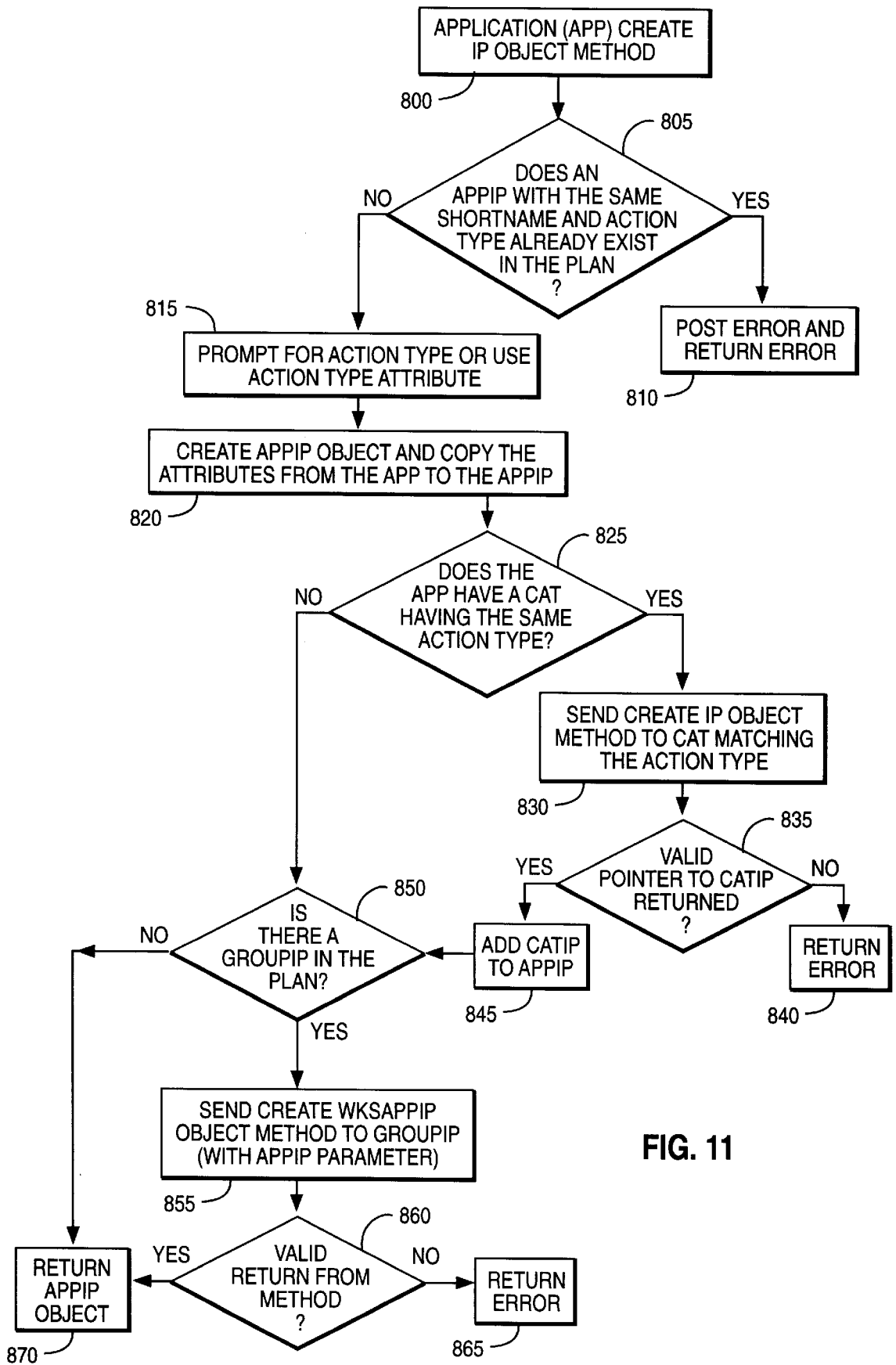
FIG. 11 is a flow diagram of the process to transform an application object to an application-in-plan object.

When the administrator adds an App object to a Plan object, the Plan object calls the CREATE IP OBJECT method on the App object as illustrated in FIG. 11. The CREATE IP OBJECT method for the App object begins in method entry block 800 and continues to decision block 805 where the App object checks to see if there are any AppIP objects in the Plan object with the same short name and action type already in the plan object. Alternatively, this check could have been done at the Plan level as well. If there is a duplicate AppIP object, the Network Installation program wants to prevent another AppIP object with the same attributes from being added to the Plan object, so it will post an error message and return with an error in return block 3810.

If the AppIP object to be created will be unique for the Plan object, the network installation program will prompt for an action type or use the action type already specified by the administrator in the App notebook in step 815. In one preferred graphical user interface, administrators can check a box in the App object notebook to have the App object prompt for the action type when it is added to a Plan object. In step 820, the App object will create a new AppIP object and copy over the attributes from the App object to the AppIP object.

Processing continues to decision block 825 where the application object checks to see if it has a Cat object with the desired action type. If it does not, processing continues to decision block 850. If there is a Cat object with the same action type, processing continues to step 830 where the CREATE IP OBJECT method is sent to the Cat object with the same action type. Upon return from the method, decision block 835 checks to see if a valid CatIP object was returned. If the object was not returned, processing ends with an error in return block 840. Preferably, when errors occur in any of the CREATE IP OBJECT methods, the object will engage in some cleanup to delete objects that may have been created before the error, but that are no longer valid because of the error.

If a valid CatIP object was returned, it will be added to the AppIP object in step 845 and processing will continue to decision block 850 where the Application object will check to see if there is a GroupIP object in the Plan object. Alteratively, this check could have been performed by the Plan object. If there is no GroupIP object in the Plan object, processing ends with return block 870 where the AppIP object is returned.

If there is a GroupIP object in the plan object, in step 855, the CREATE WKSAPPIP OBJECT method will be sent to the GroupIP object with the AppIP object as one of the method parameters. If the method returns with an error in decision block 860, processing ends with error return block 865. If the method returns without an error, processing ends with return block 870 where the AppIP object is returned.

FIG. 12 begins with the CREATE IP OBJECT method for the Cat and CatIP objects in method entry block 900. The processes for the Cat and CatIP CREATE IP OBJECT methods can be illustrated by a single flowchart since they differ only by the location from which the attributes are copied to the created CatIP object. Processing continues from the method entry block to step 905 where a new CatIP object is created and the attributes from the Cat object or the old CatIP object are copied to the new CatIP object. Next, decision block 910 checks to see if the Cat object or old CatIP object has a default Rsp File object. If it does not have a default Rsp File, processing ends with return block 935 where the new CatIP object is returned. If the Cat or old CatIP object has a default Rsp File object, processing continues to step 915 where the CREATE IP OBJECT method will be sent to the default Rsp File object. The return from the method will be checked in decision block 920. If a valid Rsp File object was not returned, processing ends with an error in return block 925. If a valid Rsp File object was returned, processing continues to step 930 where the returned Rsp File object is added to the new CatIP object. Finally, processing ends with return block 935 where the new CatIP object is returned.

FIG. 13 begins with the CREATE IP OBJECT method for the Rsp File object in method entry block 950, and continues to step 955 where a new Rsp File object is created and the attributes from old Rsp File objects are copied to the new Rsp File object. Rsp Files objects are treated the same whether they are a descendent of a Plan object or not. Processing ends with return block 960 where the new Rsp File object is returned.

Figure 14:
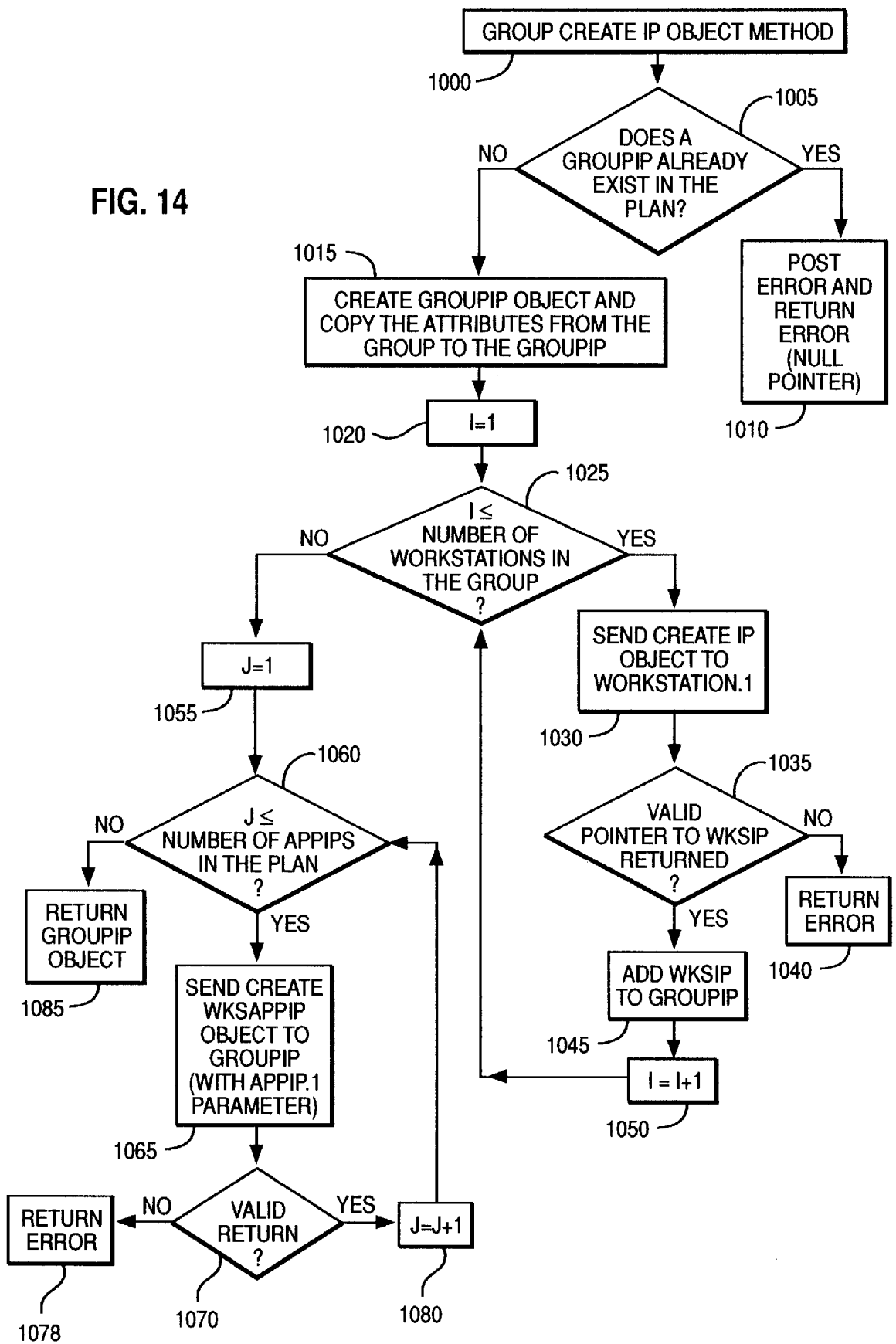
FIG. 14 is the process of adding a workstation group object to the plan object thereby creating a workstation group-in-plan object.

When the administrator adds a workstation group object to a Plan object, the Plan object calls the CREATE IP OBJECT method on the Group object as illustrated in FIG. 14. The CREATE IP OBJECT method for the Group object begins in method entry block 1000 and continues to decision block 1005 where the group object checks to see if a GroupIP object already exists in the Plan object. Alternatively, this check could have been done at the Plan level as well. If a GroupIP object already exists in the Plan, the Network Installation program will prevent another GroupIP object from being added to the Plan object, by posting an error message and returning with an error in return block 1010. As mentioned earlier, the invention could be extended to allow more than one GroupIP object in the Plan object so long as all the WksIP objects that are descendents of the Plan object are unique.

If the Plan object does not have a GroupIP object, processing continues to step 1015 where the Group object will create a new GroupIP object and copy over the attributes from the Group object to the GroupIP. Processing continues to step 1020 where counter I is set to 1. Decision block 1025 follows where counter I is checked to see if it is less than or equal to the number of Wks objects in the Group object. If this check is true, meaning that not all the Wks objects in the Group object have been checked, the CREATE IP OBJECT method is sent in step 1030 to the Wks object indexed by counter I. Upon return from the method, decision block 1035 checks to see if a valid WksIP object was returned. If the object was not returned, processing ends with an error in return block 1040. If a valid WksIP object was returned, it is added to the GroupIP object in step 1045 and counter I is incremented by 1 in step 1050 before returning to decision block 1025.

If all the Wks objects in the Group object have been transformed to WksIP objects and added to the GroupIP object, processing continues to step 1055 where counter J is set to 1. Decision block 1060 follows where counter J is checked to see if it is less than or equal to the number of AppIP objects in the Plan. Alternatively, this check could have been made by the Plan object. If this check is true, meaning that not all the AppIP objects in the Plan objects have been transformed into WksAppIp objects for the WksIPs object in the Group object, the CREATE WKSAPPIP OBJECT method is sent in step 1065 to the GroupIP object with an additional parameter of the AppIP object indexed by counter I. This method is sent to associate the WksIPs that were added to the Plan object with the AppIP objects that already exist in the plan object. If the method returns with an error in decision block 1070, processing ends with error return block 1075. If the method returns without an error, processing continues with step 1080 where counter J is incremented by 1 and flow continues to decision block 1060.

Once all the AppIP objects in the Plan object have been transformed to WksAppIP objects for all the WksIP objects in the GroupIP object, processing ends with method return block 1085 where the GroupIP object is returned.

Figure 15:
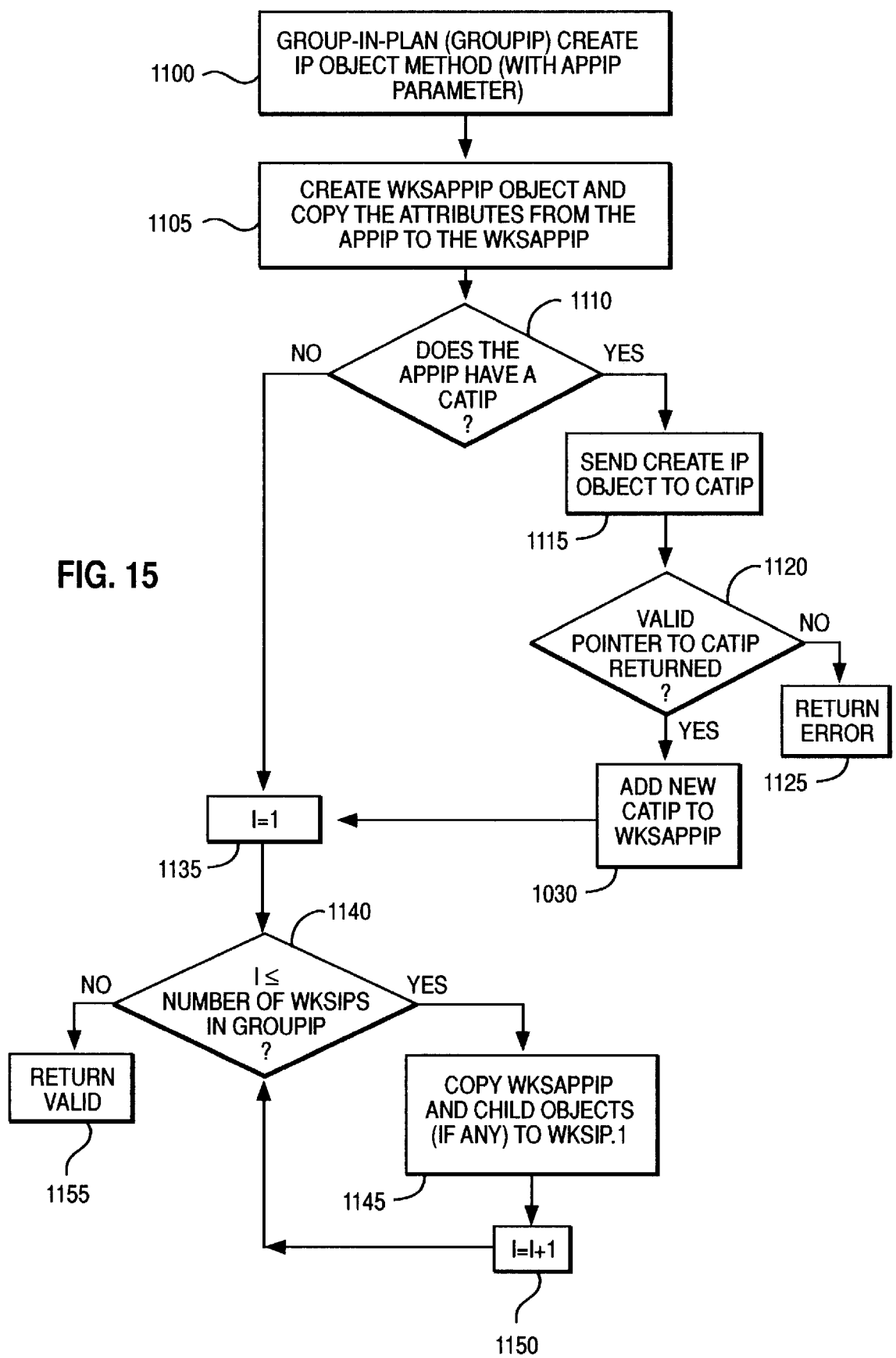
FIG. 15 is a flow diagram of creating workstation application-in-plan object.

FIG. 15 begins with the CREATE WKSAPPIP OBJECT method for the GroupIP object in method entry block 1100. This method has the additional parameter of a pointer to an AppIP object so that the method knows how the WksAppIP object should be created. The process continues to step 1105 where a new WksAppIP object is created and the attributes from AppIP object are copied to the WksAppIP object. AppIP objects are different from WksAppIP objects in that not all attributes are surfaced to the administrator and the WksAppIP object has different functionality from the AppIP. That is, the administrator can not change attributes at the workstation level, but must do so globally at the application level. An alternative embodiment could allow the administration to change these attributes if that fine a granuality was required. Processing continues to decision block 1110 where the AppIP object checks to see if it has a CatIP object. If it does not, processing continues to step 1135. If there is a CatIP object, processing continues to step 1115 where the CREATE IP OBJECT method is sent to the CatIP object. Upon return from the method, decision block 1120 checks to see if a valid CatIP object was returned. If the object was not returned, processing ends with an error in return block 1125. If a valid CatIP object was returned, it will be added to the WksAppIP in step 1130 and processing will continue to step 1135 where counter I is set to 1135. Next, decision block 1140 checks counter I is checked to see if it is less than or equal to the number of WksIP objects in the GroupIP object. If this check is true, meaning that not all the WksIP objects in the GroupIP object have been checked, the WksAppIP object and its child objects, such as CatIP object and Rsp File object, if they exist, will be copied over to the WksIP object indexed by counter I so that the WksAppIP hierarchy of objects are unique instances in sep 1145. Afterwards, step 1150 increments counter I by 1 and processing continues with decision block 1140. Once all the WksIP objects in the GroupIP object are checked, processing ends without errors with return block 1155.

FIG. 16 begins with the CREATE IP OBJECT method for the Wks object in method entry block 1170, and continues to step 1175 where a new WksIP object is created and the attributes from Wks object are copied to the new WksIP object. Processing ends with return block 1180 where the new WksIP object is returned.

Figure 17A:
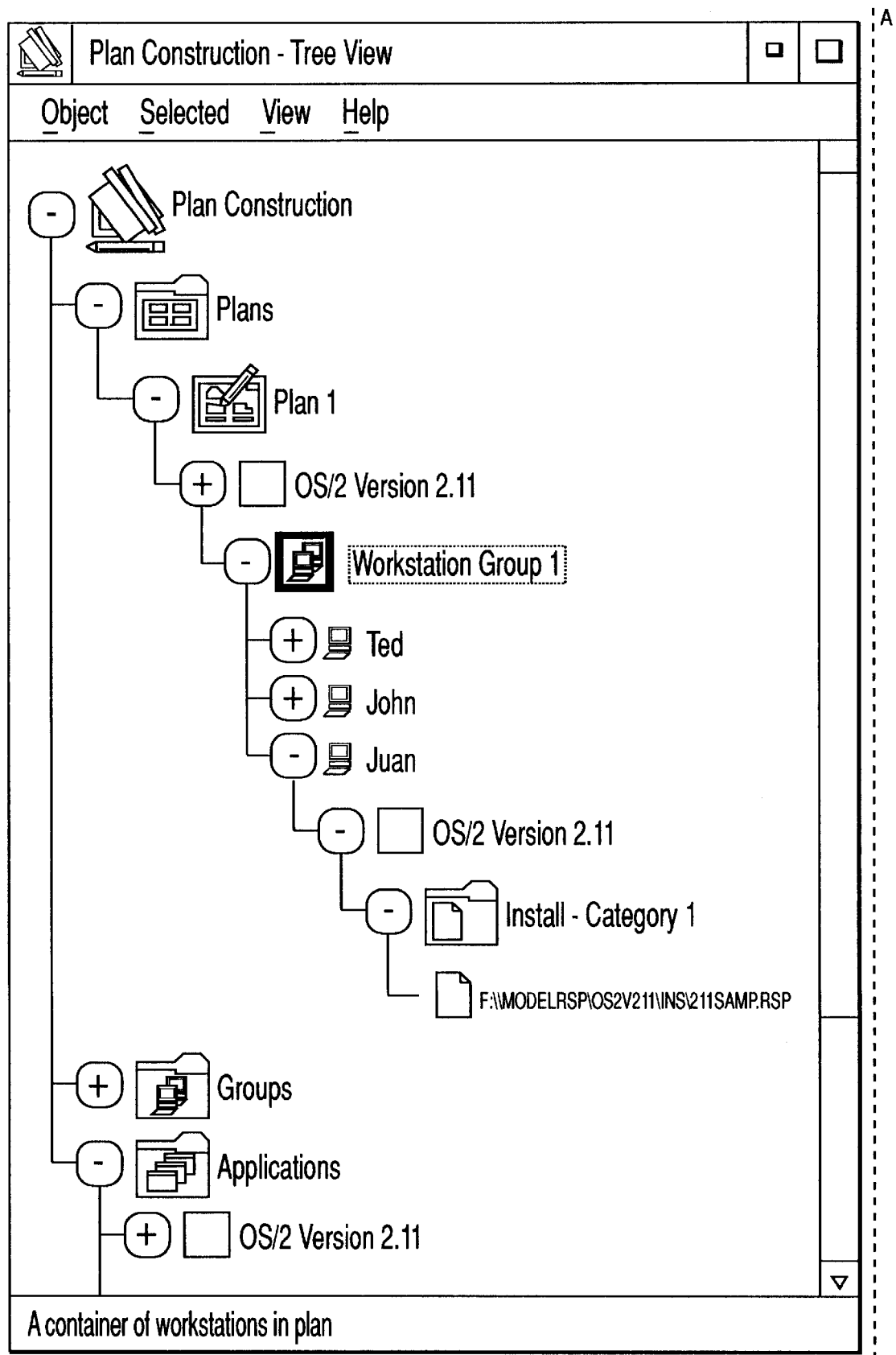
FIG. 17 depicts one possible graphical user interface handling the objects.
Figure 17B:
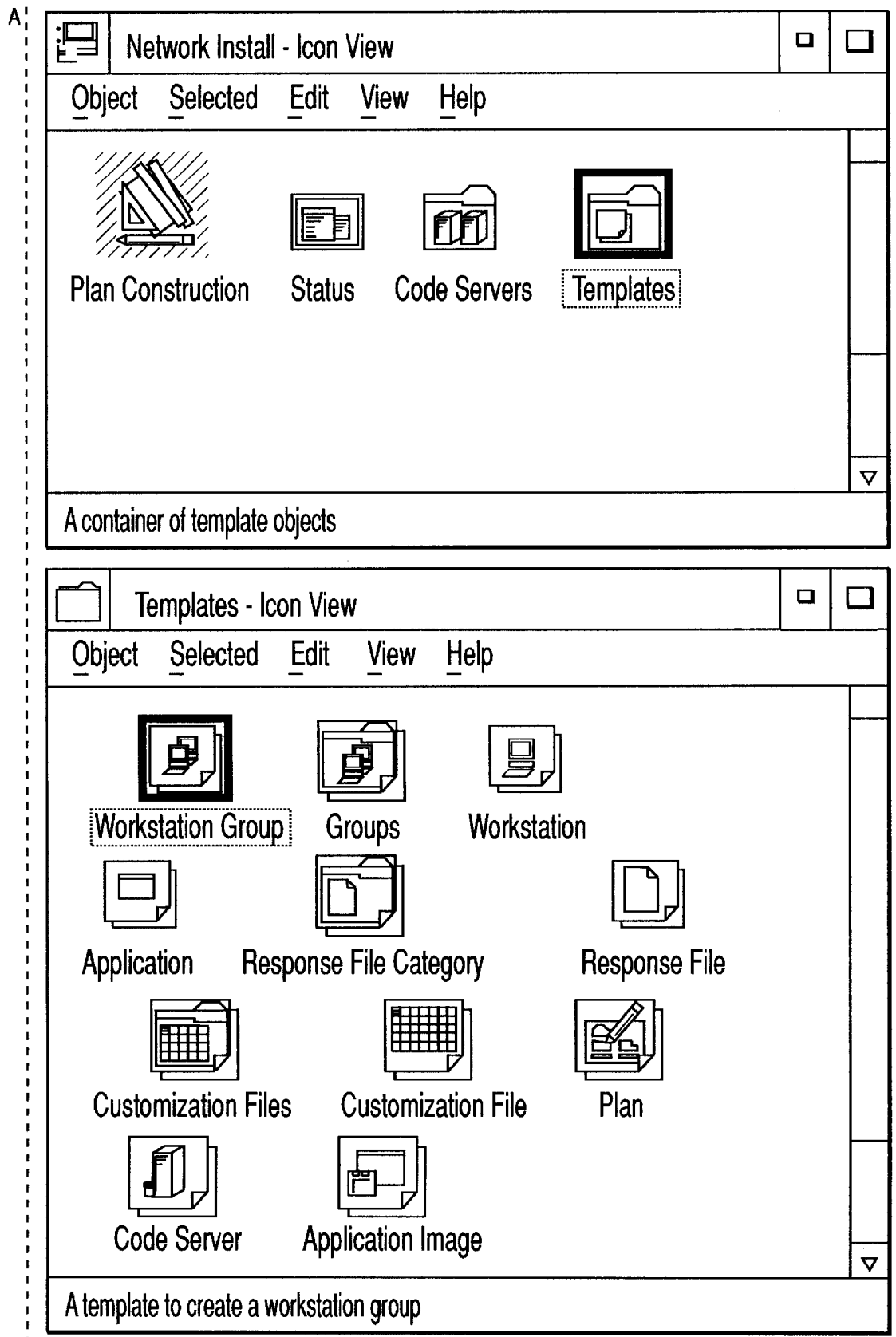

In a graphical user interface, the non-plan and plan objects are represented in the same visual manner to the administrator, such as through an icon in a tree view window. In a preferred embodiment, different object classes exist in the plan and non-plan objects. FIG. 17 shows a possible graphical interface for presenting the network installation program. On the left side of the figure is a tree view of objects showing a folder of plan objects. This folder was opened to show most of the contents of a plan object named "Plan 1". "The Plan1" object contains an AppIP object, titled "OS/2 Version 2.11". The "OS/2 Version 2.11" AppIp object" contains a CATZP object, titled "Install—Category 1". The plan object also contains a GroupIP object, titled, "Workstation Group 1". The GroupIP object was expanded to show the WksIP objects, titled, "Ted", "John", and "Juan". The "Juan" WksIP object was expanded to show the WksAppIP object, titled "OS/2 Version 2.11", which corresponds to the AppIP object of the same title. The WksAppIP object was opened to show a CatIP object, titled "Install—Category 1", and it contains a response file with a file name title of "E:/nwi/MODELRSP/OS2V211/INS/211SAMP.RSP".

The top right side of the figure shows the top level container for the network installation program, which displays the "Plan Construction", "Status", "Code Servers", and "Templates" objects. The "Plan Construction" object opens to the window on the left side of the figure. The "Status" object opens to a dialog which allows the administrator to view the status of application installation and configuration on a per workstation or per plan basis. A sample graphical representation of the dialog is shown in FIG. 18. The "Code Servers" object opens to display the code server objects defined in the network installation program. The "Templates" objects opens to provide template objects from which the administrator can create regular objects, such as a plan or application object. The opened "Templates" object is shown in the bottom right side of the figure.

The graphical representation in FIG. 17 is not the only way in which the objects in a network installation program can be depicted to the administrator. Although both objects are not shown, similar objects, such as App and AppIP objects, will have the same icon representation unless the administrator physically changes the associated icon. One skilled in the art could design many alternative graphical user interfaces for the network installation program.

While the invention has been shown and described with reference to particular embodiments thereof, it will be understood by those skilled in the art that the invention can be practiced, with modification, in other environments. For example, although the invention described above can be conveniently implemented in a general purpose computer selectively reconfigured or activated by software, those skilled in the art would recognize that the invention could be carried out in, in firmware or in any combination of software, firmware or hardware including a special purpose apparatus specifically designed to perform the described invention. Therefore, changes in form and detail may be made therein without departing from the spirit and scope of the invention as set forth in the accompanying claims.

We claim:

1. A method for building an installation plan object for installing an application in a network of computers comprising the steps of:

creating an installation plan object from a template of a prototypical installation plan object;

from a workspace container object containing potential child objects of the installation plan object, selecting objects for inclusion in the installation plan object, wherein the selected object include an application object and a group object which respectively represent an application to be installed over the network and a group of workstations upon which the application is to be installed; and transforming the selected objects into child objects of the installation plan object.

2. The method as recited in claim 1 wherein the selecting step comprises a drag and drop of an icon representing the selected object from a display area allocated to the workspace container object to a display area allocated to the installation plan object.

3. The method as recited in claim 1 wherein the potential child objects further include a category object having a plurality of response file objects each for installing a respective one of a plurality of applications over the network.

4. The method as recited in claim 1 wherein the potential child objects include a plurality of response file objects for the application object, each response file object for performing a different action on the application in the network.

5. The method as recited in claim 1 wherein the application object is transformed to an application-in plan object and the group object is transformed to to a group-in-plan object and the transforming step further comprises the steps of:

determining that the application-in-plan object is unique to the installation plan object;

determining an action type for the application-in-plan object;

inheriting attributes from the application object; and adding a response file object to the installation plan object which corresponds to the action type.

6. The method as recited in claim 5 wherein the group and group-in-plan objects respectively comprise a plurality of workstation objects and workstation-in-plan objects and the transforming step further comprises the steps of:

determining whether the group-in-plan object is unique to the installation plan object;

inheriting attributes from the group object;

transforming the plurality of workstation objects into the plurality of workstation-in-plan objects; and creating a plurality of workstation application-in-plan objects each of which is a child object of a respective workstation-in-plan object by copying attributes from the application-in-plan object.

7. A system including memory and processor for building an installation plan object for installing an application in a network of computers comprising:

a template of a prototypical installation plan object stored in the memory for creating an empty installation plan object;

a workspace container object containing potential child objects for selection for inclusion in the installation plan object, wherein the potential child objects include application objects which represent applications to be installed over the network and group objects which represent a group of workstations upon which application may be installed; and means for transforming the selected objects into child objects of the empty installation plan object to create a valid installation plan object.

8. The system as recited in claim 7 wherein the transforming means converts a selected application object and a selected group object into an application-in-plan object and a group-in-plan object respectively.

9. The system as recited in claim 8 wherein at least one application object includes a category object including a response file object for installing the at least one application over the network.

10. The system as recited in claim 8 wherein at least one application object includes a plurality of response file objects, each response file object for performing a different action on the at least one application in the network.

11. The system as recited in claim 10 wherein the workspace container further comprises a custom file container for containing custom file objects which customize response file objects for particular workstations.

12. The system as recited in claim 8 further comprising a code server container object for containing code server object which represent code server workstations in the network on which copies of the applications reside prior to installation of the application on a group of workstations represented by a group-in-plan object.

13. The system as recited in claim 8 further comprising a network information tool for viewing the status of the installation of applications on a group of workstations according to a valid installation plan object.

14. The system as recited in claim 7 further comprising a plans container for containing a plurality of installation plan objects.

15. A computer program product in a computer readable memory for building an installation plan object, the installation plan object for installing an application in a network of computers comprising:

a template of a prototypical installation plan object;

means for creating an empty installation plan object from the template of a prototypical installation plan object;

a workspace container object containing potential child objects of the installation plan object, wherein the potential child objects include application objects which represent application to be installed over the network; means for creating a group object which represents a group of computers in the network upon which the application may be installed;

means for selecting objects for inclusion in the installation plan object; and means for transforming the selected objects into child objects of the installation plan object.

16. The product as recited in claim 15 further comprising means of creating new application objects.

17. The product as recited in claim 15 wherein at least one application requires a response file to be installed over the network and the memory further comprises a response file object containing data necessary for the creation of the response file.

* * * * *